(12) United States Patent
Chaouachi et al.

(10) Patent No.: US 6,960,295 B2
(45) Date of Patent: Nov. 1, 2005

(54) WATER KETTLE, AND PARTICLE CATCHER/FILTER ASSEMBLY FOR SAID KETTLE

(75) Inventors: Jaleleddine Chaouachi, Hoogeveen (NL); Remco Linnewiel, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 146 days.

(21) Appl. No.: 10/023,108

(22) Filed: Dec. 17, 2001

(65) Prior Publication Data

US 2002/0083841 A1 Jul. 4, 2002

(30) Foreign Application Priority Data

Dec. 20, 2000 (EP) .............................. 00204649

(51) Int. Cl.⁷ ................................. A47J 27/21
(52) U.S. Cl. ................... 210/232; 210/299; 210/305; 210/306; 210/320; 210/466; 210/467; 210/473; 222/189.07; 99/279
(58) Field of Search ................. 210/232, 299, 210/305, 306, 311, 320, 466–467, 468, 473–474, 482, 514, 521, 477; 222/189.07; 99/279

(56) References Cited

U.S. PATENT DOCUMENTS

| 24,261 | A | * | 5/1859 | Fletcher ................. 210/467 |
| 28,771 | A | * | 6/1860 | Petton .................. 222/189.07 |
| 62,002 | A | * | 2/1867 | Carmichel ................ 210/413 |
| 62,697 | A | * | 3/1867 | Simons ................ 222/189.07 |
| 239,693 | A | * | 4/1881 | Tayer et al. ............ 222/572 |
| 612,750 | A | * | 10/1898 | McDougall ............ 222/189.07 |
| 652,413 | A | * | 6/1900 | Wallinford et al. .... 222/189.07 |
| 691,052 | A | * | 1/1902 | Freeman ............... 222/189.07 |
| 790,052 | A | * | 5/1905 | Hardie et al. .......... 222/189.07 |
| 817,452 | A | * | 4/1906 | Skinner ................ 222/189.07 |
| 818,858 | A | * | 4/1906 | Ham ....................... 202/198 |
| 866,545 | A | * | 9/1907 | Whitman ............... 222/189.07 |
| 866,796 | A | * | 9/1907 | Martindale ............ 222/189.07 |
| 1,079,280 | A | * | 11/1913 | Willard ................. 222/189.07 |
| 1,231,374 | A | * | 6/1917 | Janovitz et al. ............ 210/467 |
| 1,248,114 | A | * | 11/1917 | Hershey .................. 210/467 |
| 1,314,829 | A | * | 9/1919 | Parks ..................... 210/467 |
| 1,357,744 | A | * | 11/1920 | Taub ................... 222/189.07 |
| 2,183,773 | A | * | 12/1939 | Lehman ................... 210/467 |
| 2,583,335 | A | * | 1/1952 | Jepson ................... 222/510 |
| 4,203,761 | A | * | 5/1980 | Rose ....................... 75/499 |
| 4,206,856 | A | * | 6/1980 | Lobel et al. ............. 222/564 |
| D268,158 | S | * | 3/1983 | Doyel ..................... D7/50 |
| D285,160 | S | * | 8/1986 | Osit ....................... D7/317 |
| 4,764,274 | A | * | 8/1988 | Miller .................... 210/232 |
| 4,948,499 | A | * | 8/1990 | Peranio ................... 210/180 |
| 5,046,409 | A | * | 9/1991 | Henn ...................... 99/307 |
| 5,271,341 | A | * | 12/1993 | Wagner ................... 110/346 |
| 5,289,953 | A | * | 3/1994 | McMillan et al. ...... 222/189.07 |
| 5,672,274 | A | * | 9/1997 | Wheeler et al. ........... 210/474 |
| 5,927,180 | A | * | 7/1999 | Russo .................... 99/322 |
| 6,227,382 | B1 | * | 5/2001 | Cutler et al. ............. 210/473 |
| 6,383,381 | B1 | * | 5/2002 | O'Flynn et al. .......... 210/232 |
| 2002/0083841 | A1 | * | 7/2002 | Chaouachi et al. ......... 99/279 |

FOREIGN PATENT DOCUMENTS

| CA | 2287127 | 4/2000 | ............ A47J/27/21 |
| GB | 2344507 | 6/2000 | ............ A47J/27/21 |

* cited by examiner

Primary Examiner—Robert James Popovics

(57) ABSTRACT

A water kettle having a receptacle (1) with an inner space (2) for receiving water (3) therein and with a pouring spout (4) for pouring water from the inner space (2). The water kettle is further provided with a particle catcher (9) for catching particles from the water in the kettle. The particle catcher (9) has an inlet (11) for catching descending particles (13) which faces upwards when the kettle is in an upright position. This causes loose particles to be caught from the water and to be retained particularly effectively. Furthermore, a particle catcher for use in such a water kettle is described.

14 Claims, 5 Drawing Sheets

WATER KETTLE, AND PARTICLE CATCHER/FILTER ASSEMBLY FOR SAID KETTLE

Figure 1:
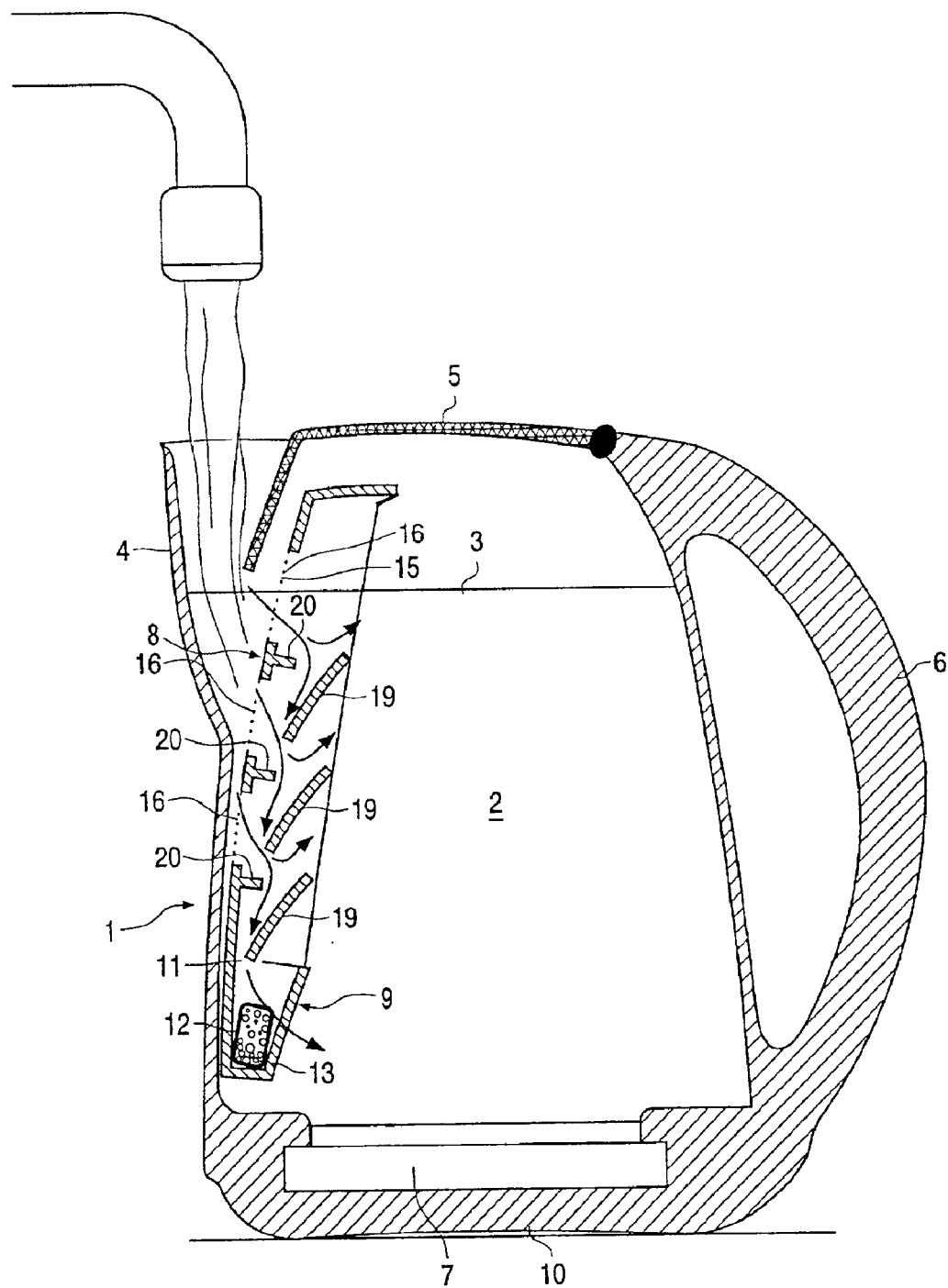

The invention relates to a water kettle comprising:
a receptacle with an inner space for accommodating water therein;
a pouring spout for pouring water from the inner space; and
a particle catcher for catching particles from water in the kettle.

The invention also relates to an assembly of a particle catcher and a filter for use in the above water kettle.

Such a water kettle is known from British patent application 2 344 507. A problem in heating of water in a water kettle is the deposition of scale. The deposited scale hampers the heat transfer to the water to be heated, and loose particles frequently accompany the water being poured out, making an unsavory impression in a beverage such as tea. The latter problem is counteracted in this known water kettle in that the heated water flows through the filter during pouring out, whereby loose particles are held back during pouring. The particle catcher is constructed as a holder with a block of a stainless steel wire gauze therein. This gauze acts as a surface on which scale from the water in the receptacle tends to deposit itself easily and to a certain extent also serves as filter which catches loose scale deposits.

A water kettle is known from Canadian patent application 2 287 127 with a filter for filtering water during pouring and with a housing for accommodating a water treatment cartridge. This housing is provided with passages in its vertical walls and is present at the inside of the filter, i.e. at the side of the filter where the water is present before it is poured out through the filter and the pouring spout. The passages in the housing are screened off with gauze. The housing is positioned at a small distance from the filter in inward direction, a channel extending vertically between the housing and the filter, through which channel water can circulate between the filter and the housing.

It is a disadvantage of these kettles that particles such as loose scale particles and, if such a kettle is used for making tea, tea leaf fragments, are not satisfactorily caught. If the kettle is provided with an outlet pouring filter, said particles will accumulate in the kettle, at least if the kettle and the filter are not regularly and thoroughly rinsed. This again leads to a reduced transmission of the outlet filter. The scale particles in addition promote scale deposits. If the kettle is not provided with an outlet filter, particles in the water are carried along to the exterior during pouring. These particles form unsavory or at least unattractive elements in the beverages prepared with the heated water.

It is an object of the invention to catch loose particles in the water in a water kettle more effectively.

According to the present invention, this object is achieved by means of a water kettle which is characterized in that the particle catcher is situated in a region in which a downward flow obtains during heating of water in the kettle and has an inlet for catching the descending particles which is directed upwards when the kettle is in an upright position.

Since the particle catcher has an inlet which is directed upwards in the stationary position for catching particles which descend in the region of the filter, particles from the water circulating owing to convection are caught in the particle catcher during heating of water. The particles suspended in the water will usually descend when the water is stationary. Therefore, and because the inlet is open in upward direction, the trapped particles remain caught in the particle catcher after heating of the water has been completed and the convection flow has stopped.

The invention may also be embodied in an assembly of a particle catcher and a filter which is specially designed for catching particles from water in a water kettle according to the invention.

Particularly advantageous aspects of embodiments of the water kettle according to the invention are defined in the dependent claims.

Figure 2:
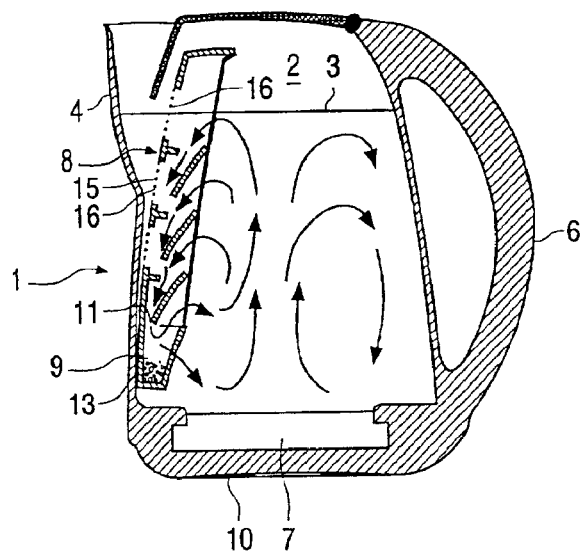
Figure 3:
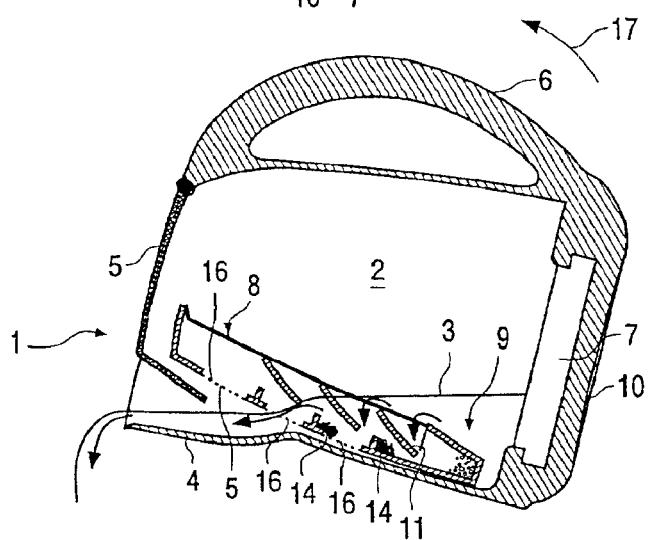
Figure 4:
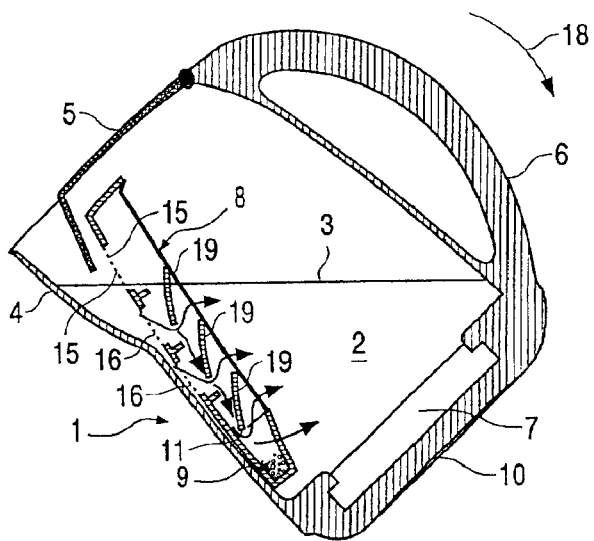
Figure 5:
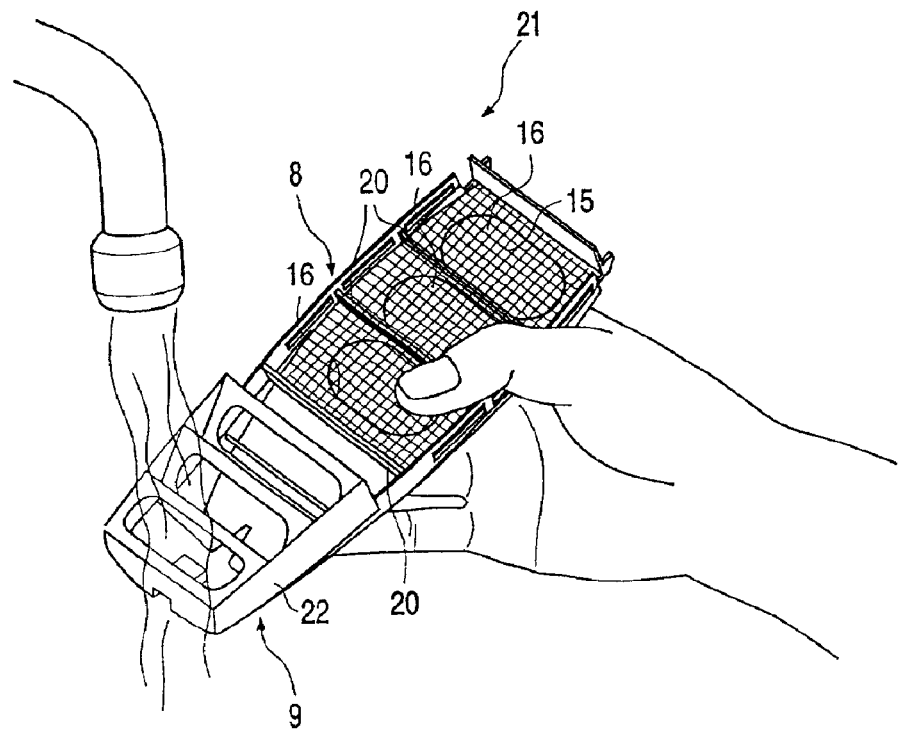
Figure 6:
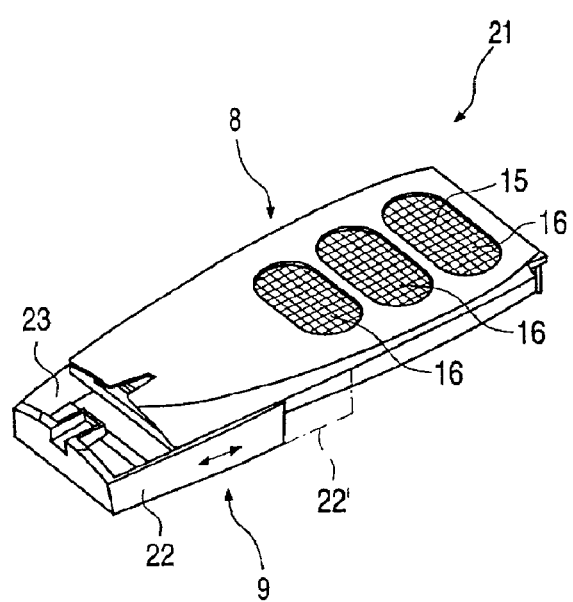
Figure 7:
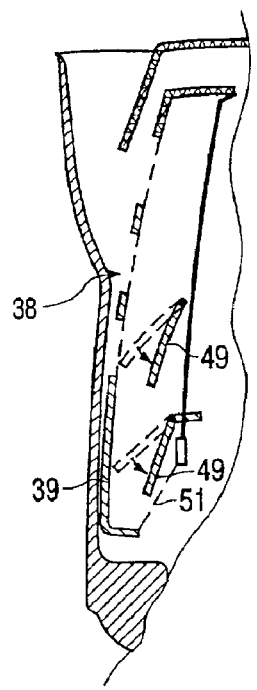
Figure 8:
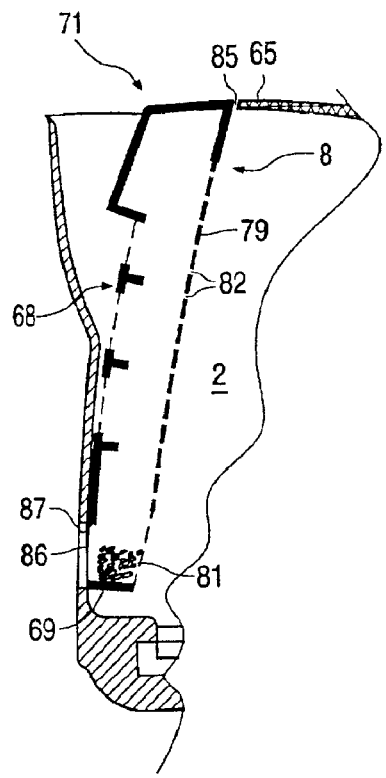
Figure 9:
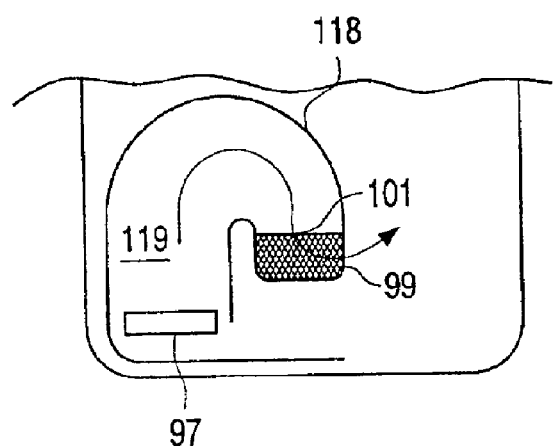
Figure 10:
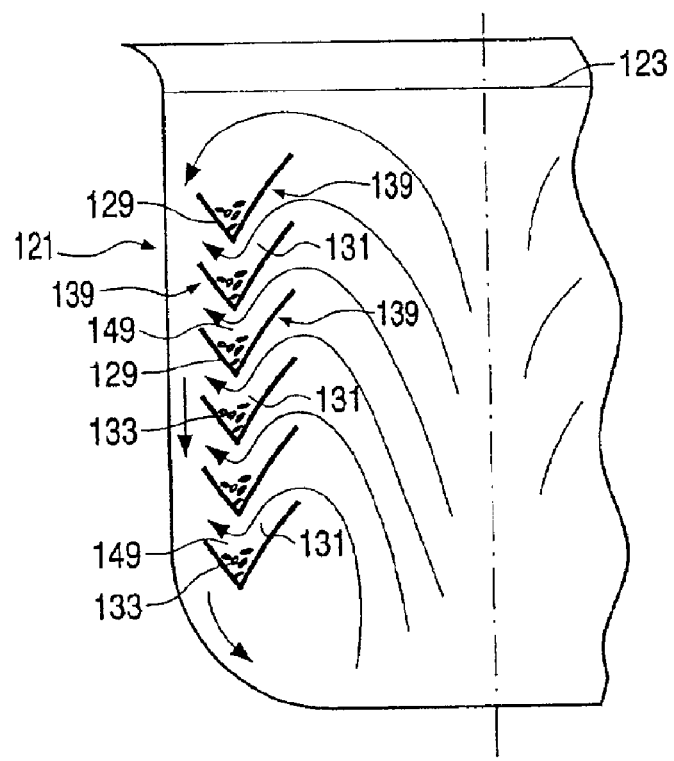

The invention will now be illustrated and explained in more detail below with reference to an embodiment and the drawing, in which:

FIG. 1 is a cross-sectional lateral view of a water kettle in a first embodiment of the invention during filling through the pouring spout, FIG. 2 is a view similar to that of FIG. 1 but on a smaller scale, during heating of water in the water kettle, FIG. 3 is view similar to that of FIG. 2 during pouring of water from the water kettle, FIG. 4 is a view similar to those of FIGS. 2 and 3 during returning of the water kettle to an upright position after pouring, FIG. 5 is a perspective view of a filter/scale catcher element of the water kettle of FIGS. 1 to 4 during rinsing, FIG. 6 is a perspective view of the filter/scale catcher element of FIG. 5 in an upside-down position compared with the position shown in FIG. 5, FIG. 7 is a cut-out cross-sectional lateral view of a water kettle in a second embodiment of the invention, FIG. 8 is a cut-out cross-sectional lateral view of a water kettle in a third embodiment of the invention, FIG. 9 is a diagrammatic cross-sectional lateral view of a lower portion of a water kettle in a fourth embodiment of the invention, and FIG. 10 is a diagrammatic cross-sectional lateral view of a portion of a water kettle in the fourth embodiment of the invention.

The invention will be explained in detail first with reference to the water kettle and components thereof depicted in FIGS. 1 to 6.

This water kettle has a receptacle 1 with an inner space 2 for accommodating water 3 therein. The receptacle 1 further has a pouring spout 4 which is in communication with the inner space 2 and with the surroundings of the receptacle 1.

The receptacle 1 further has a lid 5, a handle 6, and a diagrammatically depicted heater element 7. Although the water kettle in this example is fitted with a heater element, the proposed principle may be equally well applied to a water kettle designed for cooperating with an external heat source, such as a burner of a gas stove or an electric hot plate, or an external power source such as an induction field.

As is evident from FIG. 3, water 3 can be poured in an outward direction from the inner space 2 of the receptacle 1 through the pouring spout 4.

In this example, a filter 8 for filtering water 3 flowing in the outward direction is present in the inner space 2 (see FIG. 3). This filter, however, may also be in an alternative location, for example incorporated in the lid or in the pouring spout.

In the pouring position (FIG. 3), a particle catcher 9 for catching particles such as loose grains or flakes of scale from the water 3 is situated in the kettle upstream of the filter 8. When the kettle is in an upright position, with the bottom 10 down (FIGS. 1 and 2), the particle catcher 9 lies below the filter 8. The particles to be caught from the water may also be of a different kind, such as tea leaf fragments if the kettle is used for making tea, or particles present in the water introduced into the kettle, such as rust from the water mains. The particle catcher 9 has an inlet 11 which faces upwards when the kettle is in an upright position for catching particles descending in the region of the filter.

During use, the kettle may be filled through the pouring spout 4 as is shown in FIG. 1 or through a top of the receptacle 1 which is closed off with the lid 5 in the drawing. It is also possible to provide the kettle with a special fill inlet through which the kettle can be filled and which issues preferably upstream of the filter.

After the kettle has been filled with the desired quantity of water 3, the heater element 7 is switched on and the water 3 in the kettle is heated. A circulation then arises in the water driven by convection, as shown in FIG. 3 with the arrows in the inner space 2 and below the surface of the water 3. This circulation is directed upwards in the center of the inner space 2 and downwards in outer regions of the inner space 2 of the receptacle 1. Since the inlet 11 of the particle catcher 9 faces upwards, particles 13 descending in the region of the particle catcher will be caught by the particle catcher. The particles in general show a tendency to sink in the absence of any flow and accordingly remain inside the particle catcher with the upward opening after heating of the water has been completed. These advantageous effects are indeed also obtained if the water kettle is not provided with an outlet filter. To catch any scale not yet deposited from the water, a scale deposit attracting element such as an element 12 of stainless steel wire gauze (depicted diagrammatically in FIG. 1 only) may be accommodated in the particle catcher 9. Such an element 12 can also counteract the escape of trapped particles from the particle catcher.

During pouring of water from the kettle, as shown in FIG. 3, loose particles 14 which have not been caught by the particle catcher 9 during boiling are held back by the filter 8. The water kettle is gradually tilted further as indicated with an arrow 17. The particles accumulate in front of the gauze 15 of the filter 8, which gauze is present in the filter passages 16 of the filter 8. The water 3 then flows approximately as indicated with arrows in the water 3.

When the kettle is filled again after that, for example through the pouring spout 4 as indicated in FIG. 1, the particles collected in front of the passages 16 are washed off the filter and enter the particle catcher at least for a major portion through the inlet 11. It is prevented thereby that the quantity of loose particles in the inner space 2 rises continually. A build-up of scale deposits and a choking-up of the filter are thus counteracted. The particles collected in front of the filter gauze 15 are also detached from the filter gauze 15 for the major part and sink down when they come below the water surface also if the kettle is filled not through the pouring spout but through the open top of the inner space 2. The particles then descend at least for a major portion into the particle catcher 9 through the inlet 11.

If only a portion of the water has been poured from the kettle, an effect arises upon straightening of the kettle—as indicated with arrow 18 in FIG. 4—that the water level in the inner space 2 drops quickly at the side of the filter 8 and in the pouring spout 4. Water moves down in the filter region during this, as indicated with the arrows. This water movement also causes a loosening of particles 14 which have collected in front of the filter gauze 15, and these particles again sink for a major portion also in this situation and are caught in the particle catcher 9 through the inlet 11.

It is advantageous for guiding descending particles towards the inlet 11 of the particle catcher 9 that the inlet 11 of the particle catcher 9 is positioned such that a passage of particles between the filter 8 and the inlet 11 is prevented. This is achieved in the water kettle in the present example in that the particle catcher 9 is directly joined to the filter 8 along its side situated next to the filter 8. Counteracting the passage of particles between the inlet of the particle catching and the filter, however, may also be achieved in an alternative manner. Thus, for example, the inlet may directly merge into the filter at the side of the filter. It is also possible to provide that the edge of the inlet at the filter side directly merges into a wall extending in downward direction from the filter, which wall then serves as a guide for the particles.

It is furthermore advantageous for catching as large a proportion as possible of the particles descending from the filter that the width of the inlet 11 of the particle catcher 9 is greater than the total width of the filter passage 16. The total width of the filter passage 16 in this example is defined by the uppermost one of the passages 16, i.e. the one which has the greatest width. It is also possible, however, that the total filter passage is formed by several passages which overlap, seen from above, or which are situated next to one another. In that case the greatest width occupied by the passages as a whole is the total width of the filter passage, and the inlet of the particle catcher should preferably be wider than this total width.

The water kettle in the embodiment shown in FIGS. 1 to 6 is further provided with three guides 19 which are situated inward of the filter 8 and which are present above the inlet 11 of the particle catcher 9, at least with the water kettle in the upright position as depicted in FIGS. 1 and 2. These guides 19 guide water currents in the region of the filter during filling, during circulation owing to convection, and during the flow-back of water when a not completely emptied water kettle is straightened again, such that a major portion of the particles will reach the inlet 11 of the particle catcher 9. It is alternatively possible, however, to use a water kettle with a particle catcher provided with an upwardly directed inlet without guides.

The filter is furthermore provided with transverse walls 20 which extend in horizontal direction below a passage 16 each time. These transverse walls hamper a displacement of loose particles 14 from the inlet 11 of the particle catcher 9 during pouring (see FIG. 3). Since the loose particles 14 tend to remain closer to the inlet 11 thanks to these walls 20, the risk that they will end up outside the particle catcher 9 during descending or washing down from the filter 8 is limited. These walls thus also have a positive influence on the proportion of the particles which are caught in the particle catcher 9.

In this embodiment of the water kettle, the guides are particularly effective because they are constructed as guiding blades 19 which extend obliquely towards the filter 8 from top to bottom when the water kettle is in the upright position. This orientation of the guiding blades ensures that downward water flows in the region of the filter 8 are concentrated closely along the filter 8. This in its turn increases the probability that loose particles suspended in said water flows will enter the inlet 11 of the particle catcher 9 and will be trapped in the particle catcher 9.

The effect of concentration of downward water flows in a region closely behind the filter 8 is spread over the height of the filter because several individual guiding blades 19 situated one above the other are provided, while still the water 3 can easily pass the guides 19 during pouring.

To facilitate emptying and cleaning of the particle catcher 9 and cleaning of the filter gauze 15, the filter 8 and the particle catcher 9 form part of an assembly 21 which can be taken from the receptacle 1. In addition, a wall portion 22 of the particle catcher 9 is displaceable with respect to the filter 8 in that a passage 23 is provided in the particle catcher 9 in addition to the inlet 11. The scale deposit attracting element 12, if mounted, may also be replaced through this passage 23. As is illustrated in FIG. 5, the assembly 21 with the filter 8 and the particle catcher 9 may be rinsed and cleaned under a tap in a simple manner.

Access to the particle catcher 9 is realized in a simple manner in the assembly of FIGS. 5 and 6 in that the movable wall portion 22 of the particle catcher can be shifted with respect to the filter 8. The operational state of the wall portion 22 is indicated in FIG. 6 with dash-dot lines 22'.

The fixation of the assembly 21 in the inner space 2 is not depicted, but it may be realized, for example, in the form of snap projections or in the form of a guiding profile as is known per se from Canadian patent application 2 287 127.

In the embodiment of the kettle shown in FIG. 7, the guiding blades 49 are of a movable construction so that they lie against the filter 38 during pouring of water, thus preventing a movement of particles away from the particle catcher 39 during pouring of water from the kettle in a particularly effective manner. Furthermore, the particle catcher 39 is provided with a filter gauze 51 through which water can flow downwards and inwards from the particle catcher 39. This latter possibility has the advantage that a strong water flow into the particle catcher 39 is possible. Particles present in this flow are conducted to the particle catcher 39 in a particularly effective manner and stopped by the filter gauze 51 there.

In a second alternative embodiment of the kettle as shown in FIG. 8, a single guide 79 situated inwards of the filter 68 is provided. This guide is constructed as a plate with passages 82 which are so large (for example 3 to 5 mm in diameter) that particles can easily pass through them. The particle catcher 69 is provided with a filter gauze 81. Such a plate 79 forms a simple construction and hampers water flows from the region of the filter 68 to portions of the inner space 2 situated farther inwards other than through the particle catcher 69. The passages 82 in the plate may show a downward tendency towards the filter, if so desired, and are provided with screenings so as to counteract inward water flows through the passages 82.

This water kettle has a lid 65 which is provided with a recess 85 through which the assembly 71 of the particle catcher and the filter can be taken out. This recess 85 is substantially filled up in the operational state by an upper portion of the assembly 71 in this example so as to close off an upper side of the kettle. The pouring spout is left free thereby so as to render it possible to pour water from the kettle. The assembly 71 may be taken from the kettle without opening the lid, which further enhances the ease of operation. In particular, it is directly visible to the user in this manner at the outside of the appliance which component is to be taken out for removing the filter. If so desired, instructions may be provided on the upper side of the kettle relating to a periodic cleaning of the particle catcher 69 and the filter 68, in which instructions direct reference may be made to the assembly 71.

To render it visible whether the particle catcher is full, a transparent window 86 is provided in the wall of the kettle, and a recess 87 closely adjoining said window 86 is provided in the particle catcher, serving as a peephole through which the interior of the particle catcher 69 can be inspected. This renders it possible to observe the degree to which the particle catcher 69 is filled with trapped particles in a simple manner.

A housing 118 defining an upside-down J-shaped channel 119 is provided in the embodiment of the water kettle shown in FIG. 9. A heater element 97 is provided in a lower portion of this channel 118, generating a convection flow indicated with an arrow during operation. This convection flow is forced in downward direction in the region of the particle catcher 99 by the J-shape of the channel 119, with the result that the flow enters the inlet 101 of the particle catcher 69 mainly with a downward movement component and traverses the particle catcher 69.

FIG. 10 shows an embodiment of a water kettle according to the invention in which the guides 139 and the particle catchers 129 are integrated, while the guides 139 are situated parallel to one another and above one another. The particle catchers 129 are formed in this case by central portions of the guides 139, which are V-shaped in this example. The guides 139 form channels 149 which extend first in downward and then in upward direction, viewed from the interior to the exterior. The convection flow during heating of the water is downward between the guides 139 and the wall of the receptacle 121 and is augmented by a convection flow in upward direction from the center of the kettle which subsequently flows from the inside to the outside between the guides 139. Particles 133 descend in the outer bends of the channels 149 during this, where the flow is comparatively weak.

The inlets 131 of these particle catchers also face upwards, so that the particles, which usually will have a somewhat higher specific gravity than water, will again remain in the particle catchers when the convection flow stops after heating of the water 123 in the receptacle 121 has been stopped.

It is also possible in this case to construct the portions of the guides 139 pointing upwards from a central portion of the guides 139 in outward direction wholly or partly from a gauze material which is sufficiently fine for stopping the particles to be caught. The efficiency of the particle catchers 129 can be further enhanced thereby.

What is claimed is:

1. A water kettle comprising:
   a receptacle (1; 121) with an inner space (2) for accommodating water (3) therein;
   a pouring spout (4) for pouring water (3) from the inner space (2); and
   a particle catcher (9; 39; 69; 99; 139) for catching particles (13, 14; 133) from water in the kettle, characterized in that the particle catcher (9; 39; 69; 99; 139) is situated in an outer region of the inner space (2) of the reeptacle (1; 121); in which a downward flow is obtained during heating of water in the kettle is in an upright position, the particle catcher (9; 39; 69; 99; 139) having an inlet (11; 101; 131) for catching the descending particles (13, 14; 133) which is directed upwards when the kettle is in an upright position.

2. A water kettle as claimed in claim 1, further comprising a filter (8; 38; 68) for filtering water (3) during pouring, wherein the particle catcher (9; 39; 69) in the pouring state is situated upstream of the filter (8; 38; 68), and wherein the inlet (11) is situated below the filter (8; 38; 68) for catching descending particles (13, 14) in the region of the filter (8; 38; 68) when the kettle is in an upright position.

3. A water kettle as claimed in claim 2, wherein the inlet (11) of the particle catcher (9; 39; 69) is positioned such that a passage of particles (13, 14) between the filter (8; 38; 68) and the inlet (11) is prevented.

4. A water kettle as claimed in claim 3, wherein the inlet (11) of the particle catcher (9; 39; 69) directly adjoins the filter (8; 38; 68) substantially along its entire side situated at the side of the filter (8; 38; 68), or directly adjoins a wall extending in downward direction from the filter (8; 38; 68).

5. A water kettle as claimed in claim 2, wherein the filter (8; 38; 68) has a filter passage (16) with a given total width, and wherein the inlet (11) of the particle catcher (9; 39; 69) is wider than said given total width of the filter passage (16).

6. A water kettle as claimed in claim 1, further comprising at least one guide (19; 49; 79; 139) above the inlet (11; 101; 131) of the particle catcher (9; 39; 69; 99; 129).

7. A water kettle as claimed in claim 2, wherein the guide is situated inward of the filter (8; 38; 68).

8. A water kettle as claimed in claim 6, wherein the guide comprises at least one guiding blade (19; 49; 139) which, with the water kettle in an upright position, extends from top to bottom in an obliquely sloping outward direction towards a region situated above the inlet (11; 131).

9. A water kettle as claimed in claim 6, further comprising at least two individual guides (19; 49; 139), one situated at least partly above the other, when the water kettle is in the upright position.

10. A water kettle as claimed in claim 2, wherein the filter (8) and the particle catcher (9) form part of an assembly (21; 71) which can be taken from the receptacle (1), and wherein a wall portion (22) of the particle catcher (9) is displaceable with respect to the filter (8) so as to provide a passage (23) in the particle catcher (9) other than the inlet (11).

11. A water kettle as claimed in claim 10, wherein the movable wall portion of the particle catcher (99) can be shifted with respect to the filter (8).

12. A water kettle as claimed in claim 11, further comprising a lid (65) which is provided with a recess through which said assembly (71) can be taken out and which is substantially filled up by said assembly (71) in the operational state for closing off an upper side of the kettle.

13. A water kettle as claimed in claim 1, comprising at least two said particle catchers (129), each integrated with guiding blades (139), which guiding blades (139) are situated one above the other and define channels (149) which have a bend or corner in a central particle catcher portion (129), said central particle catcher portion (129) at the same time forming a lowermost portion of the channel (149).

14. An assembly (21) of a particle catcher (9) and a filter (8) for a water kettle, the filter (8) having filter passages (16) for filtering water which passes through the filter, and guides (19) for guiding the water which passes through the filter, the particle catcher (9) having an inlet (11), for catching particles (13) from the water which passes through the filter, the particle catcher (9) situated so that particles (13) descending from the water which passes through the filter (8) descend into particle catcher (9) through the inlet (11).

* * * * *